(12) United States Patent
Barger et al.

(10) Patent No.: US 7,641,876 B2
(45) Date of Patent: Jan. 5, 2010

(54) REDUCED LIQUID DISCHARGE IN WET FLUE GAS DESULFURIZATION

(75) Inventors: Kelly L. Barger, Kingston, TN (US); Gregg R. Doule, Knoxville, TN (US); Michael G. Varner, Knoxville, TN (US)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 12/398,568

(22) Filed: Mar. 5, 2009

(65) Prior Publication Data

US 2009/0162269 A1 Jun. 25, 2009

Related U.S. Application Data

(63) Continuation-in-part of application No. 11/486,705, filed on Jul. 13, 2006, now Pat. No. 7,524,470.

(51) Int. Cl.
*B01D 45/00* (2006.01)
*B01D 53/86* (2006.01)
*B03C 3/00* (2006.01)
*B01D 47/00* (2006.01)
*B01D 53/40* (2006.01)
*B01D 53/50* (2006.01)
*B01D 53/68* (2006.01)
*B01D 53/74* (2006.01)
*B01D 53/75* (2006.01)
*B01D 53/80* (2006.01)

(52) U.S. Cl. .............. 423/215.5; 423/244.01; 423/243.01; 423/243.06; 96/52; 96/355; 422/168; 422/170

(58) Field of Classification Search ........ None
See application file for complete search history.

(56) References Cited

U.S. PATENT DOCUMENTS 3,995,006 A 11/1976 Downs et al.
4,540,555 A * 9/1985 Franke et al. .......... 423/243.01

FOREIGN PATENT DOCUMENTS

EP 0 742 037 11/1996
WO WO88/07022 9/1988
WO WO2004/026443 4/2004

OTHER PUBLICATIONS

PCT International Search Report and The Written Opinion of the International Searching Authority dated Nov. 12, 2007—(PCT/US2007/069602).

* cited by examiner

*Primary Examiner*—Melvin C Mayes
*Assistant Examiner*—Sarah Van Oudenaren
(74) *Attorney, Agent, or Firm*—Timothy J. Olson

(57) ABSTRACT

One aspect of the invention relates to a method for removing contaminants from a flue gas stream (22). The method includes: removing fly ash from a flue gas stream (22) utilizing a particle collector (24); contacting the flue gas stream with an alkaline reagent in a wet scrubber (26); discharging a purge liquid (30) from the wet scrubber (26); and, combining at least a portion of the purge liquid with at least a portion of fly ash circulating within a dry circulating fluid bed scrubber (48) to form moistened fly ash (60).

16 Claims, 6 Drawing Sheets

REDUCED LIQUID DISCHARGE IN WET FLUE GAS DESULFURIZATION

CLAIM OF PRIORITY

This application is a continuation-in-part of U.S. application entitled, "REDUCED LIQUID DISCHARGE IN WET FLUE GAS DESULFURIZATION," having Ser. No. 11/486,705, filed Jul. 13, 2006, now U.S. Pat. No. 7,524,470, the disclosure of which is entirely incorporated herein by reference.

FIELD OF THE INVENTION

This invention relates to a wet flue gas desulfurization process. More particularly, this invention relates to reducing the amount of purge liquid discharged to a wastewater treatment system from a wet flue gas desulfurization system.

DESCRIPTION OF THE RELATED ART

Federal, state and even some local governments have laws regulating the emission of particulates, gases and other contaminants present in gas produced in coal combustion. To comply with these laws, industries must implement systems that reduce or eliminate emissions of particulates and/or gases that have been deemed harmful to the environment.

Several technologies and processes have been developed to reduce emissions of such elements. These technologies include desulfurization systems that employ fabric filters, electrostatic precipitators, and wet scrubbers. Desulfurization systems have shown sufficient efficiency in the removal of particulate and gases.

A particularly useful desulfurization system is the wet flue gas desulfurization system. Wet flue gas desulfurization systems (WFGD) purify flue gas which is produced by coal combustion. There are several known designs for WFGD systems. One example of a WFGD system uses small droplets of slurry that contain water and alkaline material, such as lime or limestone, which is sprayed into the flue gas. Another example of a WFGD system bubbles the flue gas through a bed of slurry to remove pollutants. Regardless of the design of the WFGD system, the slurry reacts with sulfur oxides ($SO_x$) present in the flue gas and removes them from the flue gas stream as precipitated compounds.

Besides the removal of $SO_x$ from the flue gas stream, the WFGD system also captures HCl and HF gases, which are removed from the flue gas stream and become water soluble salts: $CaCl_2$ and $CaF_2$, respectively. These salts dissociate and yield free $Cl^-$ and $F^-$ ions which build up in the WFGD system. This buildup can cause corrosion and other damage in the WFGD system, and can negatively affect $SO_x$ removal.

Typically, a stream of water or other liquid, or a slurry containing liquid and particles, referred to as a purge liquid, is used to purge chlorides and other unwanted compounds from the WFGD system. The purge liquid helps maintain a desired chloride concentration, which in turn, helps to protect the equipment of the WFGD system from corrosion. The purge liquid is typically diverted to a wastewater treatment facility.

Typically, wastewater treatment facilities used in conjunction with WFGD systems are expensive. The design and supply cost of such a facility can exceed the cost of other systems used in connection with the WFGD plant. The cost of the wastewater treatment facility is even more pronounced when organic acids are used in the WFGD system.

In addition to operating expense, the wastewater treatment facilities require large portions of land, additional equipment, and several buildings. The capital and operating costs of a wastewater facility are dramatically increased when a biological reactor is required to remove organic acids or other constituents that may be used in or captured by the WFGD system.

BRIEF SUMMARY OF THE INVENTION

One aspect of the invention relates to a method for removing contaminants from a flue gas stream. The method includes: removing fly ash from a flue gas stream utilizing a particle collector; contacting the flue gas stream with an alkaline reagent in a wet scrubber; discharging a purge liquid from the wet scrubber; combining at least a portion of the purge liquid with at least a portion of the fly ash to form moistened fly ash; and injecting at least a portion of the moistened fly ash into the flue gas stream upstream of the particle collector, whereby the moistened fly ash removes at least a portion of contaminants present in the flue gas stream.

Another aspect of the present invention relates to a method of reusing an amount of purge liquid in a flue gas stream treatment system. The method includes the steps of: removing fly ash from a flue gas stream and transporting the fly ash to a solids mixer; combining the fly ash with a purge liquid which has been directed from a wet scrubber to the solids mixer; forming a moistened fly ash from the fly ash and purge liquid; and injecting the moistened fly ash mixture into the flue gas stream, thereby reducing the amount of purge liquid sent to a wastewater treatment plant.

Another aspect of the invention relates to a system for reducing or eliminating an amount of purge liquid sent to a wastewater treatment plant in a flue gas treatment system. The system includes: means for removing fly ash from a flue gas stream and diverting the fly ash to a solids mixer or a dry circulating fluid bed scrubber (CDS); means for discharging a purge liquid from a wet scrubber and diverting the purge liquid to the solids mixer or CDS; means for combining the removed fly ash with at least a portion of the purge liquid to form a moistened fly ash; and means for injecting the moistened fly ash into the flue gas stream.

The details of one or more embodiments of the invention are set forth in the accompanying drawings and the description below. Other features, objects and advantages of the invention will be apparent from the description and drawings, and from the claims.

BRIEF DESCRIPTION OF THE DRAWINGS

For the purpose of illustrating the invention, the drawings show a form of the invention that is presently preferred. However it should be understood that the present invention is not limited to the precise arrangements and instrumentalities shown in the drawings, wherein.

DETAILED DESCRIPTION

The processes and systems described herein are typically used in coal-combustion systems; however it is foreseeable to use such processes and systems in waste-to-energy plants, and other facilities that produce a flue gas stream.

Flue gas streams contain, among other things: ash particles, noxious substances and other impurities that are considered to be environmental contaminants. Prior to being emitted into the atmosphere via a smoke stack ("stack"), the flue gas stream undergoes a cleansing or purification process. In coal combustion, this purification process is normally a desulfurization system.

Figure 1:
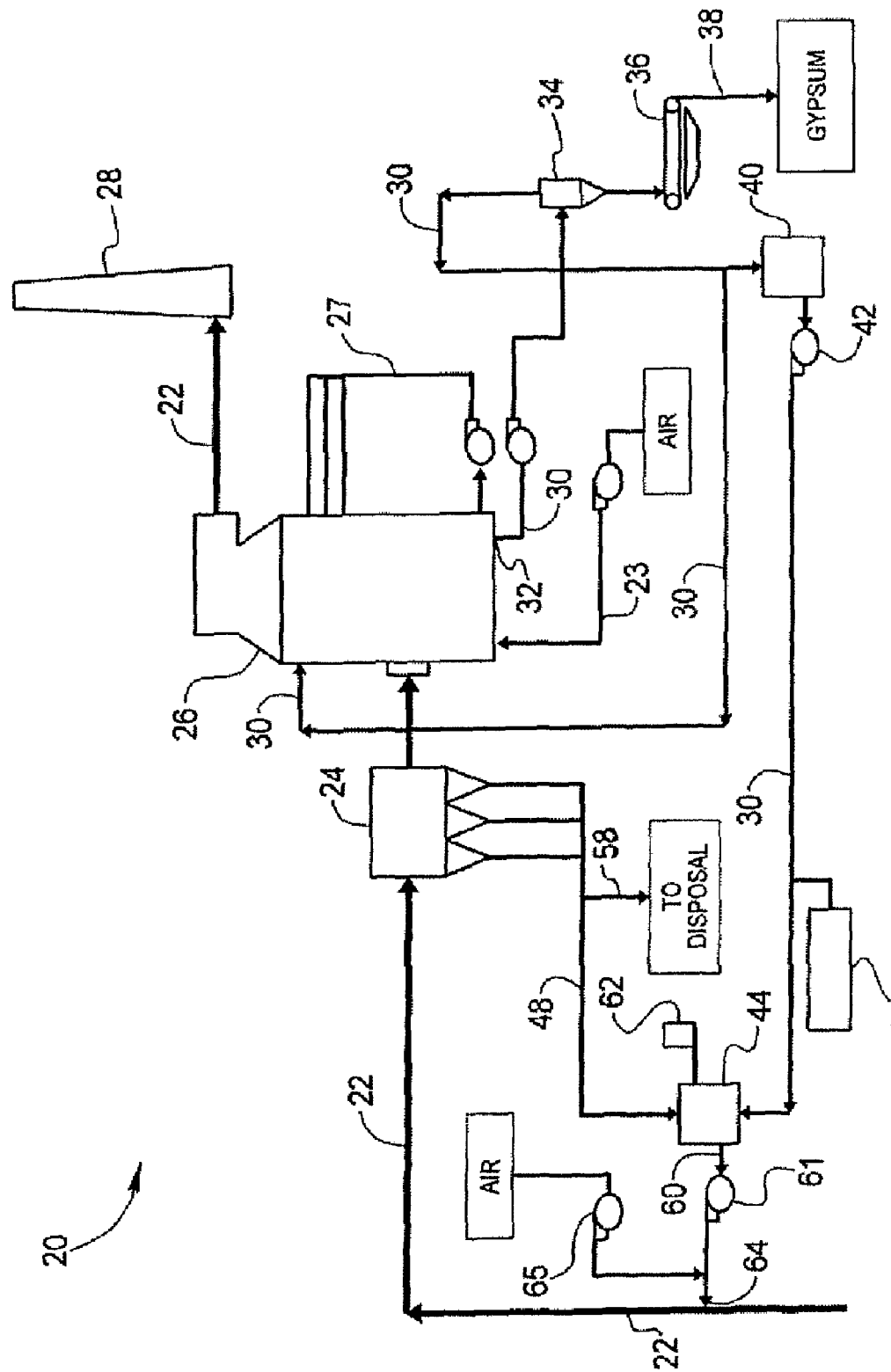
FIG. 1: shows one embodiment of a WFGD system of the present invention.
Figure 2:
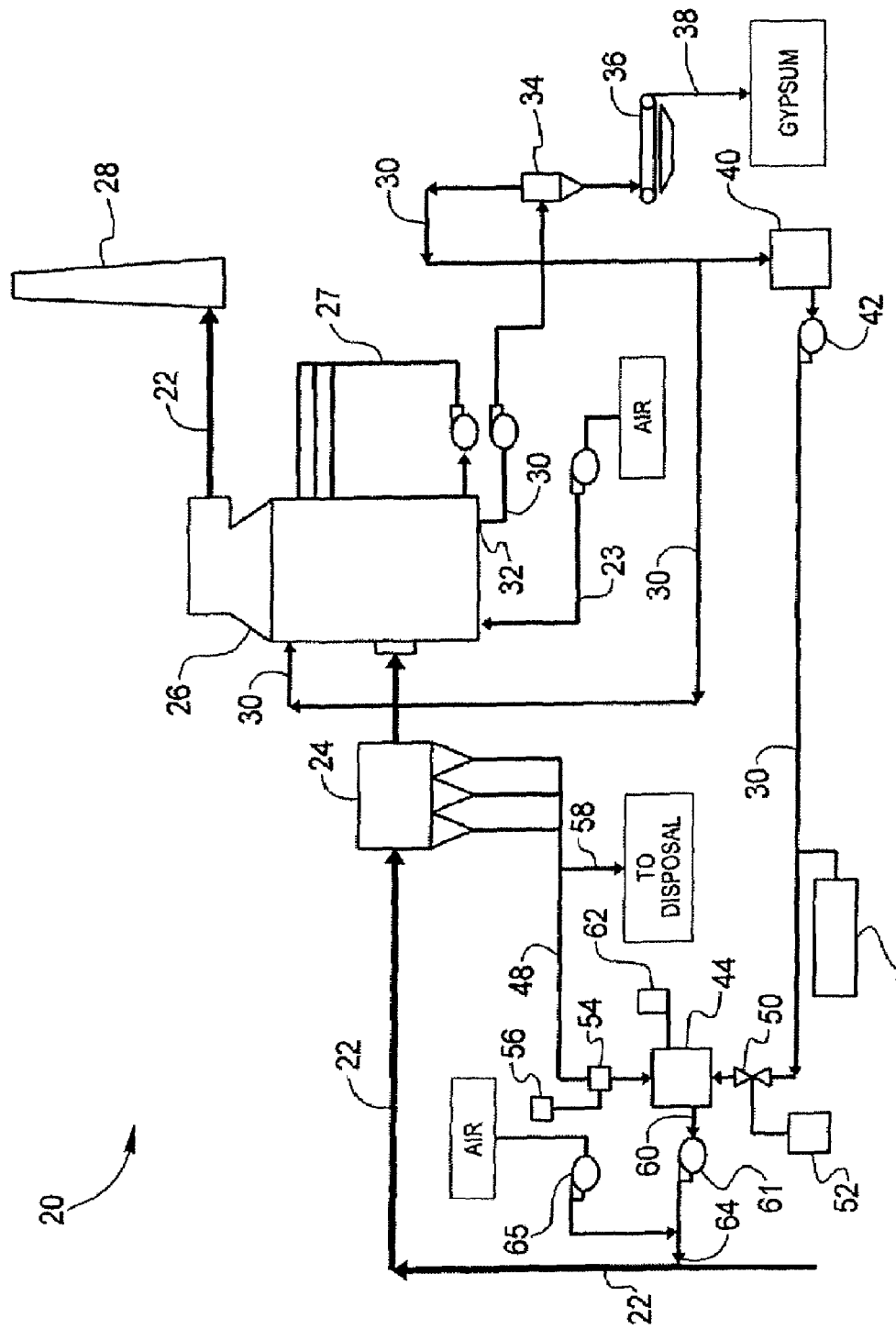
FIG. 2: shows one embodiment of a WFGD system of the present invention.
Figure 3A:
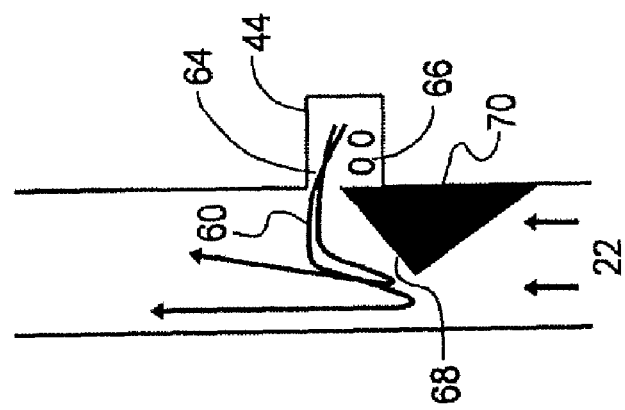
FIG. 3A: shows a portion of FIG. 3 in more detail.
Figure 3:
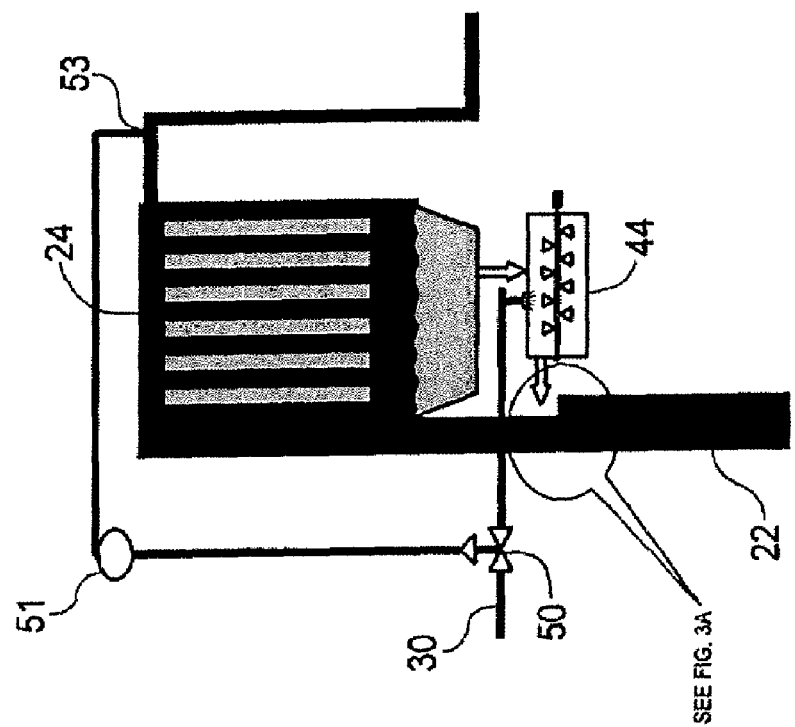
FIG. 3: shows the injection of moistened fly ash into flue gas produced by a boiler.

Now referring to FIGS. 1-3, in which like numerals correspond to like parts, in the WFGD system 20, a flue gas stream 22 leaves a boiler and travels to a particle collector 24. Particle collector 24 may be a bag house, an electrostatic precipitator, a venturi-type scrubber or any similar apparatus that can facilitate the removal of particles from flue gas stream 22.

Ash and other particulate contaminants (collectively referred to hereinafter as "fly ash") present in flue gas stream 22 are collected in particle collector 24. The collected particulate contaminants may be disposed of or may be recycled within WFGD system 20.

After passing through particle collector 24, flue gas stream 22 travels to a wet scrubber 26. Wet scrubber 26 removes acidic gases such as $SO_2$ from the flue gas by exposing the flue gas to an alkaline reagent. The alkaline reagent can be limestone, lime, or any other alkaline compound, in a slurry, which is sprayed into flue gas stream 22 as droplets. The unreacted alkaline reagent can be recirculated within wet scrubber 26 by utilizing a slurry recirculating line 27 to introduce the alkaline reagent to wet scrubber 26. The reacted alkaline reagent is fully oxidized to form gypsum by exposing it to air from oxidation air supply line 23.

After contacting the flue gas stream 22 with the alkaline reagent, the flue gas stream is transported to a stack 28 for release into the atmosphere. Flue gas stream 22 may be subjected to other reagents, or one or more devices, that facilitate the removal of contaminants prior to being released into the atmosphere via stack 28. Other treatments include, but are not limited to, mercury removal via contact with a reagent such as activated carbon, additional particulate collection, and the like.

The reaction of the alkaline reagent with the acidic components of flue gas stream 22 in wet scrubber 26 produces salt and water. In addition, HCl and HF gases react to form water soluble salts that dissociate to form free $Cl^-$ and $F^-$ ions in the alkaline reagent. As discussed above, the increase of chloride ions tends to corrode the system and results in a chloride concentration in the alkaline reagent, which hinders the removal of acidic components from flue gas stream 22.

To prevent an unacceptable chlorine ion ($Cl^-$) concentration, and to alleviate the corrosive tendencies of $Cl^-$ and the negative effect $Cl^-$ has on $SO_x$ removal within wet scrubber 26, most WFGD systems use a purge liquid 30 to control the chloride level within the system. Purge liquid 30 typically also removes fine particulate material that is present in wet scrubber 26. Purge liquid 30 is typically sent to a wastewater treatment system or plant before it is discharged into the environment.

Purge liquid 30 is discharged from wet scrubber 26 at point 32. After it is discharged from wet scrubber 26, purge liquid 30 is then sent to a holding tank or other system component that diverts the purge liquid to be transported to a wastewater treatment plant. Purge liquid 30 is mainly water, reacted and unreacted alkaline reagent and contains water soluble ions such as $Cl^-$, however some particulates, known as "fines" may be in the purge liquid as well.

In one embodiment of the present invention, purge liquid 30 is transported from wet scrubber 26 to hydrocyclone 34. Hydrocyclone 34 utilizes centrifugal force to separate particulate matter from the purge liquid. The particulate matter, together with a small amount of purge liquid 30, referred together as underflow liquid, drops down into a tank, a reservoir, or a vacuum filter 36 and can then be transported through process stream 38 to a separate system or apparatus used to collect gypsum.

Purge liquid 30 purified by hydrocyclone 34, and not containing particulate matter or containing a small fraction of particulate matter, and referred to as overflow, travels by gravity through pipework to a storage tank 40. Substantially all of purge liquid 30 from hydrocyclone 34 is transported to storage tank 40. Any purge liquid 30 not diverted to storage tank 40 is typically sent to vacuum filter 36 along with any particulate matter. However, in one embodiment, a portion of purge liquid 30 that has been purified by hydrocyclone 34 can be recycled to wet scrubber 26. Purge liquid 30 is not sent to a wastewater treatment plant.

After purge liquid 30 reaches storage tank 40, the purge liquid travels via a pump 42 to a solids mixer 44. Optionally, a process heater 46 may be installed to be in contact with purge liquid 30 as it is transported by pump 42 to solids mixer 44. Process heater 46, which can be electric or steam driven, is used to heat the purge liquid prior to delivering it to solids mixer 44.

A portion of collected fly ash 48 from particle collector 24 is transported to the solids mixer 44 as well. Fly ash 48 may be directed to solids mixer 44 from particle collector 24 by fluidized troughs, pneumatic transfer, or by any other means for transporting dry ash known by those skilled in the art.

As shown particularly in FIG. 2, the amount of purge liquid 30 entering solids mixer 44 may be regulated by a control valve 50. Control valve 50 is optionally connected to a user interface 52, which may be, for example, a keyboard, a monitor or a computer, or other device that allows a user to increase, decrease or stop the transportation of purge liquid 30 into solids mixer 44. Additionally, as shown in FIG. 3, control valve 50 may optionally be connected to a device 51, which measures the temperature at a point 53 located behind particle collector 24.

Also as shown in FIG. 2, a sliding gate, rotary valve or other control mechanism 54, may be used to regulate the amount of fly ash 48 that enters solids mixer 44. Likewise, control mechanism 54 may be connected to a user interface 56 that allows a user to increase, decrease or stop the transportation of fly ash 48 to solids mixer 44. Excess fly ash 48 not directed to solids mixer 44 may be brought to an ash storage facility or an ash disposal system by process stream 58.

Within solids mixer 44, purge liquid 30 moistens fly ash 48 to form a moistened fly ash 60. Moistened fly ash 60 can be in a dry free flowing form or can be in a slurry form.

When fly ash 48 is moistened, any unreacted alkaline particles (i.e. calcium and/or magnesium) present in the fly ash will become activated. The activated alkaline particles in moistened fly ash 60 are utilized to remove contaminants from flue gas stream 22.

In one embodiment, the proportions of fly ash 48 and purge liquid 30 are controlled to ensure that moistened fly ash 60 remains dry, fluffy and free flowing. The ratio of fly ash 48 to purge liquid 30 is maintained sufficiently high to keep moistened fly ash 60 free flowing. In this embodiment the moistened fly ash contains between about 94% to about 98% by weight of fly ash based on the total weight of moistened fly ash 60. However, the amount of fly ash in moistened fly ash 60 is typically between about 94% and about 95% by weight of the total weight of the moistened fly ash. To ensure the correct ratio, the moisture of the moistened fly ash 60 in solids mixer 44 is monitored by a humidistat 62, which is operatively connected to solids mixer 44.

Alternatively, in another embodiment, the moistened fly ash 60 contains more purge liquid 30 making the moistened fly ash more slurry-like. Moistened fly ash 60 of this embodiment is formed by mixing purge liquid 30 with fly ash 48 in solids mixer 44. To form the slurry-like moistened fly ash 60, the moistened fly ash contains about 30% to about 50% by weight of fly ash based on the total weight of the moistened fly ash.

Utilizing moistened fly ash 60 in a dry free-flowing form is advantageous in systems that have limited space or have limited access to water sources. Utilizing moistened fly ash 60 in a slurry-like form is advantageous in systems that have flue gas streams with very high temperatures or contain a high amount of sulfur therein.

Once moistened fly ash 60 is formed, either in its substantially free flowing or slurry form, it is then introduced to newly produced flue gas 22. Moistened fly ash 60 is typically injected into flue gas stream 22 at a position 64 upstream of particle collector 24. However, moistened fly ash 60 can be injected into flue gas stream 22 at any position that allows the moistened fly ash to contact and remove contaminants from the flue gas stream.

Moistened fly ash 60 may be transported from solids mixer 44 to position 64 by a pump 61. Optionally, air from pump 65 may be introduced to moistened fly ash 60 before it is introduced to flue gas stream 22.

As shown particularly in FIGS. 3 and 3A, moistened ash 60 flows out of solids mixer 44 through mixer outlets 66 and down an ash injection chute 68. Ash injection chute 68 can be a simple flat plate or it may have a perforated or sawtooth design. Ash injection chute 68 promotes even distribution of the moistened fly ash across the width of the duct flue gas stream 22 travels in.

Below ash injection chute 68 may be a false wall 70, which accelerates the speed of flue gas stream 22 to the proper velocity at which moistened fly ash 60 can be entrained into the flue gas stream.

Once moistened fly ash 60 is introduced to flue gas stream 22, the moisture is evaporated therefrom and humidifies the flue gas stream. During the drying process, the alkaline material present within the fly ash reacts with SO2, HCl and other acidic components to remove these constituents from the flue gas stream 22. The dehumidified fly ash is brought back to particulate collector 24 where it is collected or removed as discussed in more detail above. If organic acids such as dibasic acid (DBA) or adipic acid are used in system 20, they are evaporated and captured in particle collector 24. If a fabric filter is used in the system, even greater SO2 and HCl removal is achieved.

Figure 4:
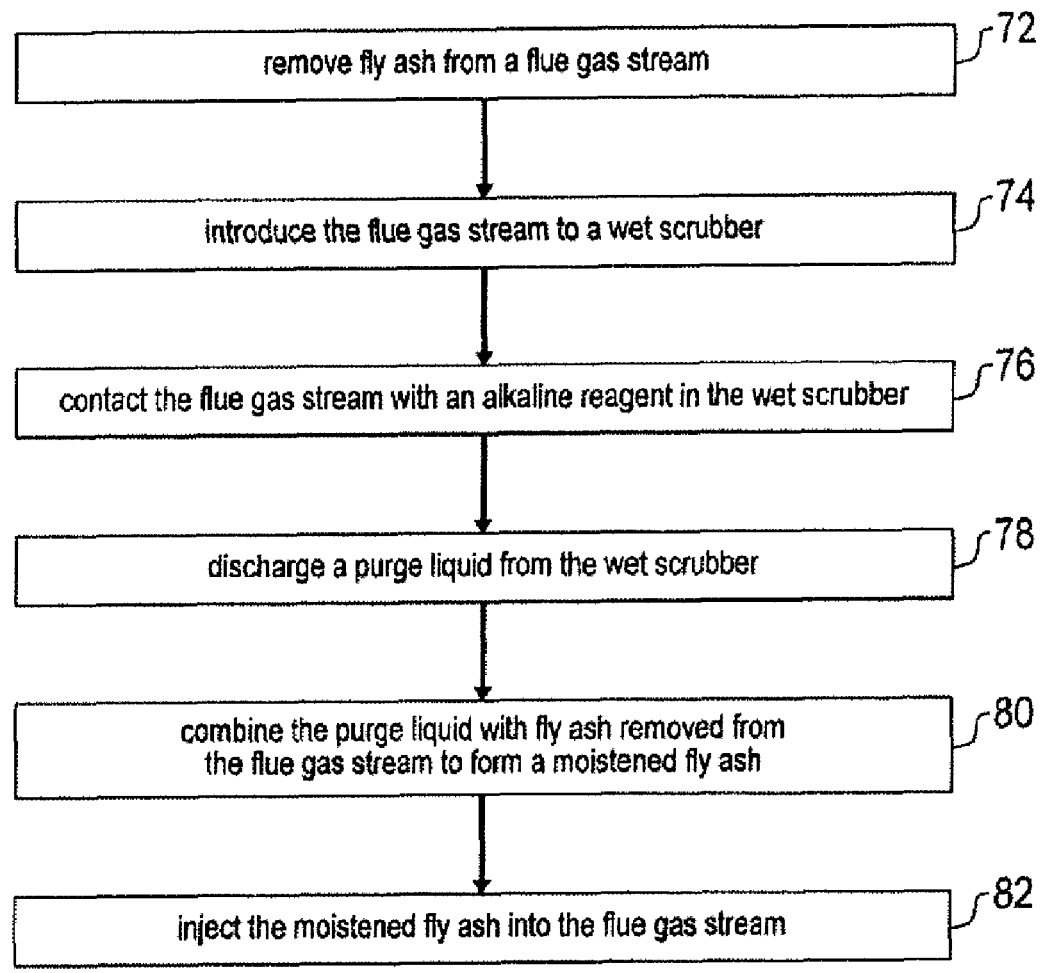
FIG. 4: shows a flowchart of one embodiment of the present invention.

As illustrated in the process sequence of FIG. 4, in step 72, at least a portion of the fly ash present in flue gas stream 22 is removed from the flue gas stream. The fly ash is removed by introducing flue gas stream 22 into a particle collector 24.

In step 74, flue gas stream 22 is then introduced to a wet scrubber 26, where in step 76 it is contacted with an alkaline reagent. As described in more detail above, the alkaline reagent is typically an alkaline compound that reacts with any acidic components present in flue gas stream 22. The reaction of the alkaline reagent with the acidic components results in the production of corrosive chloride ions.

To remove the corrosive chloride ions, in step 78, a purge liquid 30 contains corrosive chloride ions and removes them from wet scrubber 26. After collecting at least a portion of the chloride ions from wet scrubber 26, purge liquid 30 is discharged from the wet scrubber and sent to hydrocyclone 34.

After the particulate material is removed or reduced from purge liquid 30, in step 80 the purge liquid is combined with at least a portion of fly ash 48 collected from particle collector 24. The combination of purge liquid 30 and fly ash 48 form a moistened fly ash 60.

As shown in step 82, moistened fly ash 60 is then injected into flue gas stream 22 at a point 64 upstream of particle collector 24. Once moistened fly ash 60 is introduced to flue gas stream 22, the moisture is evaporated therefrom and humidifies the flue gas stream. During the drying process, the alkaline material present within the flyash reacts with SO2, HCl and other acidic components to remove these constituents from the flue gas stream 22. The dehumidified fly ash is brought back to particulate collector 24 where it is collected or removed as discussed in more detail above. If organic acids such as dibasic acid (DBA) or adipic acid are used in system 20, they are evaporated and captured in particle collector 24. If a fabric filter is used in the system, even greater SO2 and HCl removal is achieved.

Figure 5:
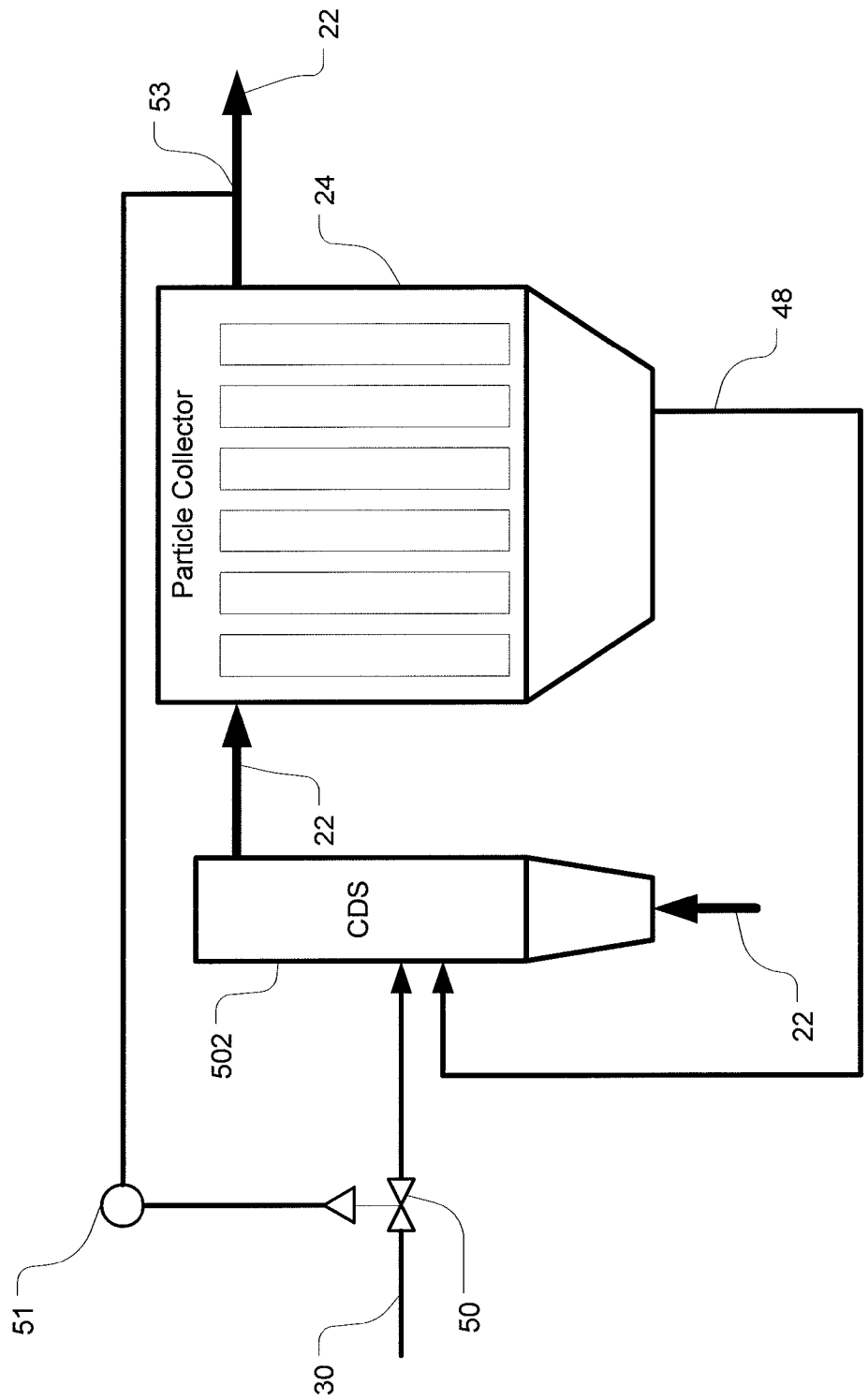
FIG. 5: is a diagram generally depicting a further embodiment of the invention in which purge liquid and fly ash are introduced to a dry circulating fluid bed scrubber (CDS)

In a further embodiment generally depicted in FIG. 5, fly ash 44 from the particle collector 24 is fed, at least in part, to a circulating dry scrubber, also referred as a dry circulating fluid bed scrubber, (CDS) 502. The fly ash 44 may be introduced to the CDS via, for example, a spray head or other disperser system located within the CDS and configured to blow, spray, inject or otherwise place the flay ash into the CDS. The dry circulating fluid bed scrubber 502 is preferably configured to bring together high levels of solid, re-circulating, finely atomized water, hydrated lime and flue gas within a circular fluid bed reactor. The fluid bed material may include solids, including calcium hydroxide, fly ash from the combustion process, and solid reaction products from the flue gas particulate collection device. Upon leaving the CDS, the solid particles may be separated from the flue gas by a particulate removal system, such as, for example a fabric filter baghouse or an electrostatic precipitator. In one proposed embodiment, the CDS 502 is also configured to bring purge liquid 30 together with the flue gas stream 22 and fly ash 44. The fly ash 44 is introduced into the flue gas stream 22 by the CDS 502 to thereby remove SO2 and/or SO3 and other acidic gases from the flue gas stream 22. The flue gas stream 22 is then fed to, for example, a particle collector 24 where particulate matter may be removed, at least in part, form the flue gas stream 24. In addition, purge liquid 30 is fed to the CDS 502, preferably separately from the fly ash 44. In this way the fly ash 44 is moistened by combining at least a portion of the purge liquid 30 with at least a portion of the fly ash to form moistened fly ash that is partially re-circulated within the CDS 502. The moistened fly ash removes at least a portion of contaminants present in the flue gas stream.

Figure 6:
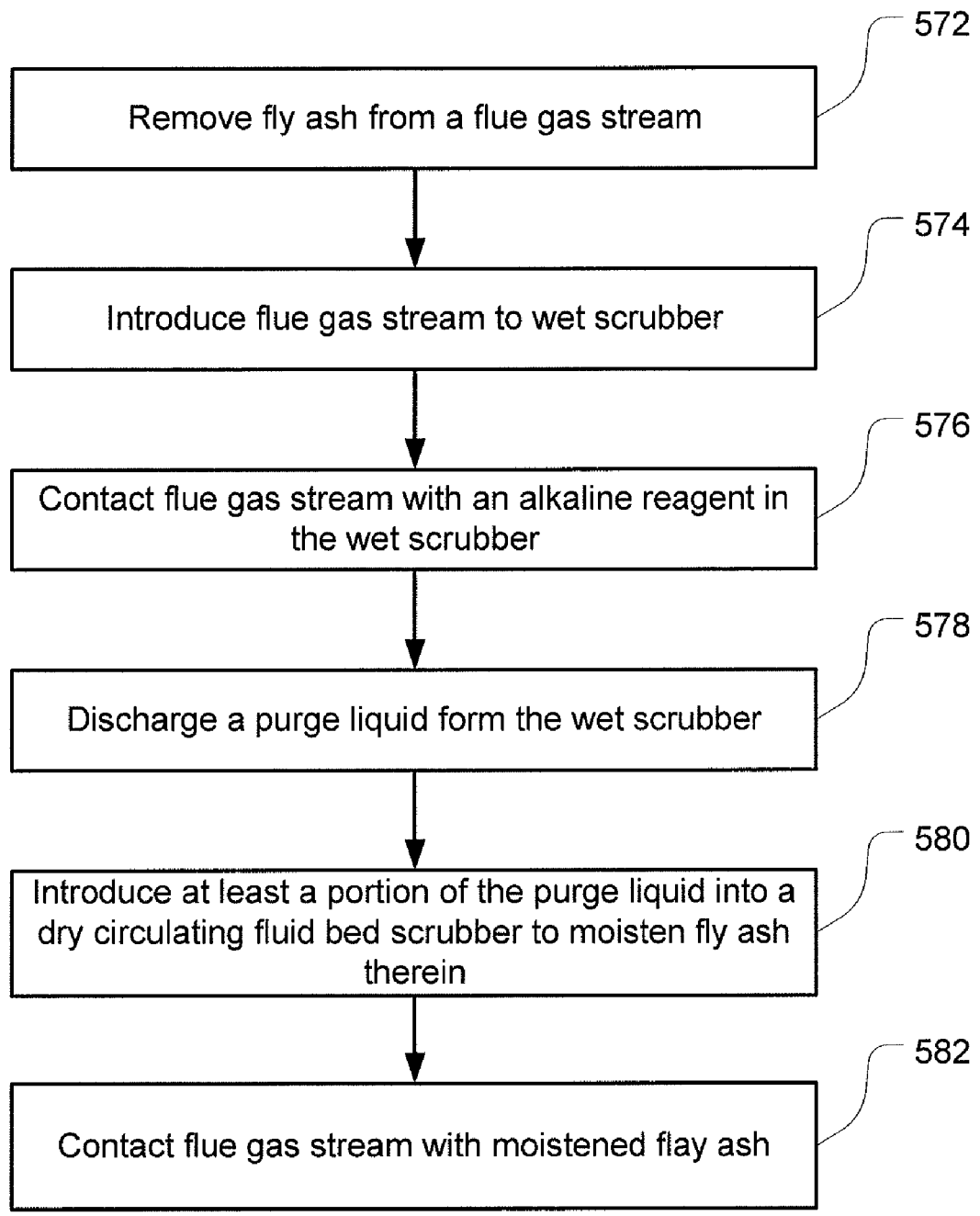
FIG. 6: shows a flowchart of a further embodiment of the present invention.

As illustrated in the process sequence of FIG. 6, in step 572, at least a portion of the fly ash present in flue gas stream 22 is removed from the flue gas stream. The fly ash is removed by introducing flue gas stream 22 into a particle collector 24.

In step 574, flue gas stream 22 is then introduced to a wet scrubber 26, where in step 576 it is contacted with an alkaline reagent. As described in more detail above, the alkaline reagent is typically an alkaline compound that reacts with any acidic components present in flue gas stream 22. The reaction of the alkaline reagent with the acidic components results in the production of corrosive chloride ions.

To remove the corrosive chloride ions, in step 578, a purge liquid 30 contains corrosive chloride ions and removes them from wet scrubber 26. After collecting at least a portion of the chloride ions from wet scrubber 26, purge liquid 30 is discharged from the wet scrubber and sent, at least in part, to hydrocyclone 34.

After the particulate material is removed or reduced from purge liquid 30, in step 580 the purge liquid is introduced, at least in part, to a dry circulating fluid bed scrubber 502 to moisten fly ash contained therein. The combination of purge liquid 30 and fly ash 48 form a moistened fly ash 60.

As shown in step 582, moistened fly ash 60 is then contacted with a flue gas stream 22 introduced to the CDS 502. During the drying process, the alkaline material present within the fly ash reacts with SO2, HCl and other acidic components to remove these constituents from the flue gas stream 22. The dehumidified fly ash is brought back to particulate collector 24 where it is collected or removed as discussed in more detail above. If organic acids such as dibasic acid (DBA) or adipic acid are used in system 20, they are evaporated and captured in particle collector 24. If a fabric filter is used in the system, even greater SO2 and HCl removal is achieved.

The embodiments described herein decrease the amount of fresh alkaline reagent needed by the system overall. Further, the embodiments described herein reduce or eliminate transporting used purge liquid 30 to a wastewater treatment plant.

One or more embodiments of the present invention have been described. Nevertheless, it will be understood that various modifications may be made without departing from the spirit and scope of the invention. Accordingly, other embodiments are within the scope of the following claims.

What is claimed is:

1. A method for removing contaminants from a flue gas stream, the method comprising:
    removing fly ash from a flue gas stream utilizing a particle collector;
    contacting the flue gas stream with an alkaline reagent in a wet scrubber;
    discharging a purge liquid from the wet scrubber; and
    combining at least a portion of the purge liquid with at least a portion of fly ash circulating within a dry circulating fluid bed scrubber (CDS) to form moistened fly ash, whereby the moistened fly ash removes at least a portion of contaminants present in the flue gas stream.

2. A method according to claim 1, wherein after discharging the purge liquid from the wet scrubber particles present in said purge liquid are removed therefrom or reduced, before combining at least a portion of the purge liquid with at least a portion of the fly ash.

3. A method according to claim 1, wherein the particle collector is one of a bag house, an electrostatic precipitator and a fabric filter.

4. A method according to claim 1 wherein said alkaline reagent is selected from one of lime and limestone.

5. A method according to claim 1 wherein said purge liquid comprises water.

6. A method according to claim 1 wherein the portion of fly ash is present in the moistened fly ash in an amount of between about 94% to about 98% by weight based on the total weight of the moistened fly ash.

7. A method according to claim 6 wherein the portion of fly ash is present in the moistened fly ash in an amount of between about 94% to about 95% by weight based on the total weight of the moistened fly ash.

8. A method according to claim 1 wherein the portion of fly ash is present in the moistened fly ash in an amount of between about 30% to about 50% by weight based on the total weight of the moistened fly ash.

9. A method according to claim 1, wherein the contaminants comprise SOx, Hcl, and acidic gases.

10. A method of reusing an amount of purge liquid in a flue gas stream treatment system, the method comprising the steps of:
    removing fly ash from a flue gas stream and transporting the fly ash to a dry circulating fluid bed scrubber (CDS); and
    combining at least a portion of the purge liquid with at least a portion of fly ash circulating within the CDS to form moistened fly ash.

11. A method according to claim 10 wherein removing the fly ash from the flue gas stream comprises introducing the flue gas stream to a particle collector.

12. A method according to claim 10 wherein the moistened fly ash reacts with the flue gas stream so as to remove at least a portion of contaminants present in the flue gas stream.

13. A system for reducing or eliminating an amount of purge liquid sent to a wastewater treatment plant in a flue gas treatment system, the system comprising:
    means for removing fly ash from a flue gas stream and diverting the fly ash to a dry circulating fluid bed scrubber (CDS);
    means for discharging a purge liquid from a wet scrubber and diverting the purge liquid to the CDS; and
    means for combining at least a portion of the purge liquid with at least a portion of fly ash circulating within the CDS to form a moistened fly ash and whereby the moistened fly ash removes at least a portion of contaminants present in the flue gas stream.

14. A system according to claim 13 wherein the purge liquid comprises water.

15. A system according to claim 13 wherein the means for removing fly ash from a flue gas stream is one of a bag house, an electrostatic precipitator and a fabric filter.

16. A system according to claim 13 wherein the means for combining the removed fly ash with at least a portion of the purge liquid to form a moistened fly ash comprises a dry circulating bed scrubber (CDS).

* * * * *